United States Patent
Khadhraoui et al.

(10) Patent No.: US 8,612,155 B2
(45) Date of Patent: Dec. 17, 2013

(54) METHODS AND SYSTEMS FOR MICROSEISMIC MAPPING

(75) Inventors: Bassem Khadhraoui, Cambridge (GB); Harold David Leslie, Girton (GB); Gwenola Michaud, Milan (IT); W. Scott Leaney, Katy, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 381 days.

(21) Appl. No.: 12/756,195

(22) Filed: Apr. 8, 2010

(65) Prior Publication Data

US 2010/0262373 A1    Oct. 14, 2010

Related U.S. Application Data

(63) Continuation-in-part of application No. 12/420,061, filed on Apr. 8, 2009.

(51) Int. Cl.
G01V 1/00    (2006.01)
G01V 1/28    (2006.01)
G01V 1/40    (2006.01)

(52) U.S. Cl.
CPC .......... *G01V 1/40* (2013.01); *G01V 2210/123* (2013.01)
USPC ........................................................ 702/16

(58) Field of Classification Search
CPC ............................................... G01V 2210/123
USPC ............................................................ 702/16
See application file for complete search history.

(56) References Cited

U.S. PATENT DOCUMENTS

| | | | |
|---|---|---|---|
| 5,771,170 A | 6/1998 | Withers et al. | |
| 6,462,549 B1 * | 10/2002 | Curtis et al. | 324/323 |
| 6,662,109 B2 * | 12/2003 | Roggero et al. | 702/6 |
| 6,947,843 B2 * | 9/2005 | Fisher et al. | 702/13 |
| 6,962,549 B2 * | 11/2005 | Dreibholz et al. | 475/284 |
| 7,391,671 B2 | 6/2008 | Shin | |

(Continued)

FOREIGN PATENT DOCUMENTS

| | | |
|---|---|---|
| EP | 297737 | 1/1989 |
| GB | 2450163 | 12/2008 |
| GB | 2450163 A * | 12/2008 |

OTHER PUBLICATIONS

Errington, A. Sensor Placement for Microseismic Event Location, University of Saskatchewan at Saskatoon, Oct. 2006.*

(Continued)

*Primary Examiner* — Sujoy Kundu
*Assistant Examiner* — Timothy H Hwang
(74) *Attorney, Agent, or Firm* — Jianguang Du; Tim Curington

(57) ABSTRACT

Methods and systems for the detection and localization of microseismic events are proposed which operate in real-time. Hypocenters in three spatial dimensions are provided along with an estimate of the event origin time. Sensor positions may be distributed in 3D space, and are not confined to linear arrays in vertical wells. A location of the event is approximated and a grid search, based on the approximate location of the event, is used to derive a residual function over a finer sampling followed by a gradient search of the residual function to optimize the location of the event.

20 Claims, 10 Drawing Sheets

(56) References Cited

U.S. PATENT DOCUMENTS

| | | |
|---|---|---|
| 7,391,675 B2 | 6/2008 | Drew |
| 7,986,587 B2 * | 7/2011 | Duncan et al. ............. 367/40 |
| 8,041,510 B2 * | 10/2011 | Dasgupta ................... 702/12 |
| 8,078,437 B2 * | 12/2011 | Wu et al. .................... 703/2 |
| 2002/0087272 A1 | 7/2002 | Mackie |
| 2002/0173914 A1 * | 11/2002 | Zhang et al. ................ 702/7 |
| 2005/0190649 A1 * | 9/2005 | Eisner et al. ............... 367/38 |
| 2005/0256642 A1 * | 11/2005 | Barber et al. ............... 702/6 |
| 2006/0041410 A1 * | 2/2006 | Strebelle ................... 703/10 |
| 2006/0062084 A1 * | 3/2006 | Drew ......................... 367/68 |
| 2006/0081412 A1 * | 4/2006 | Wright et al. .............. 181/104 |
| 2008/0068928 A1 * | 3/2008 | Duncan et al. ............. 367/73 |
| 2009/0010104 A1 | 1/2009 | Leaney |
| 2009/0238040 A1 * | 9/2009 | Duncan et al. ............. 367/38 |
| 2010/0018718 A1 * | 1/2010 | Krebs et al. ............... 166/369 |

OTHER PUBLICATIONS

Oye, V et al., Automated Seismic Event Location for Hydrocarbon Reservoirs, Computers & Geosciences 29 (2003), 851-863.*

Block, Lisa V. et al., Seismic Imaging of the Velocity Structure and the Location of a Hydrofrac in a Geothermal Reservoir, Earth Resources Laboratory Industry Consortia Annual Report; Dec. 1991.*

J. Drew, et al, "Automated Microseismic Event Detection and Location by Continuous Spatial Mapping," SPE Annual Technical Conference and Exhibition, vol. 95513, Oct. 9, 2005.

G. Michaud, S. Leaney, "Continuous microseismic mapping for real-time event detection and location", SEG Expanded Abstracts 27, 1357 (2008).

Young, et al., Mining-Induced Microseismicity: Monitoring and Applications of Imagin and Source Mechanism Techniques, Mining-induced Microseismicity: Monitoring and Applications, vol. 139, 1992.

* cited by examiner

Azimuth - dark
Inclination - light

METHODS AND SYSTEMS FOR MICROSEISMIC MAPPING

CROSS REFERENCE TO RELATED APPLICATIONS

This application is a continuation-in-part application of co-pending U.S. patent application Ser. No. 12/420,061, filed Apr. 8, 2009, the content of which is incorporated herein by reference for all purposes.

BACKGROUND OF THE DISCLOSURE

1. Field of the Invention

The present disclosure relates to methods and systems for detection and analysis of seismic waveform data and, more particularly, methods and systems for the real-time 3D detection of microseismic events usable in non-vertical boreholes.

2. Background of the Related Art

A reliable real-time scheme for the detection/localization of microseismic events is important for Hydraulic Fracture Monitoring (HFM) and Reservoir Monitoring (RM), to enable timely decision making during stimulation operations and for reservoir management, among other applications. Microseismic event detection, location estimation and source parameter analysis provide critical information on the position, extent and growth of fractures caused during fluid injection or through other active or passive causes.

Standard historical approaches to determining event detection and location, such as the Geiger algorithm, have relied on time-picking of P-wave and S-wave arrival phases together with the computation of P-wave polarization. These approaches have been applied to individual sensor channels and hence have tended to be unstable and unreliable in the presence of significant noise. Accordingly, intervention, pick verification, and manual pick adjustment have often been required, but those steps are time consuming and do not permit real-time operation.

A model-based algorithm to image the distribution of microseismic sources in both time and space has been described and applied to episodic tremors in a subduction zone. An efficient implementation of a similar method was developed for HFM and is disclosed in U.S. Pat. No. 7,391,675, which is hereby incorporated in its entirety. In particular, the '675 reference discloses what has been referred to as the Coalescence Microseismic Mapping (CMM) technique for real-time event detection and localization of seismic events. This approach does not require that discrete time picks be made on each of the waveforms. Rather, individual streams of seismic multi-component waveforms at each sensor are operated upon continuously using a function former, such as a signal-to-noise ratio (SNR) estimator. The output of the function formers from all sensors are then individually mapped (migrated) into a 4D space-time map of hypocenter and origin time using model based travel times. This allows simultaneous event detection and localization by identifying map locations and origin times for which a collective or multi-sensor processor output exceeds a detection threshold. Waveform polarization is included in the discrimination algorithm both as a means of distinguishing consistent portions of the waveform streams which contain P-wave and S-wave phases that are being mapped, and as means of orienting a vertical (radial-depth) plane of localization, as the mapping algorithm is run in a 2D rather than 3D spatial geometry. In other words, the CMM algorithm delivers in real-time, event detection and location based on a signal to noise ratio onset measure using modeled travel times of P and S-waves.

Moreover, it should be noted that the CMM algorithm is a robust event-detector in the presence of noise, and that it is very efficient in making an event detection and location by assuming a vertical receiver array or, more precisely, by assuming that the seismic signal receivers disposed in the wellbore are positioned in the plane containing the center of a target grid. However, the CMM technique as described above has some inherent drawbacks, including that it has not provided standard measures of localization uncertainty which in the past have been computed from the measurement versus model residuals associated with discrete time picks, and that the assumed geometries cause the accuracy of the above approach to break down as wellbore deviation increases and events move away from the target plane. The CMM technique may also encounter drawbacks for multi-well data acquisition, where the ability to handle an arbitrarily distributed receiver network is preferred.

Accordingly, it will be appreciated that there exists a desire to improve upon conventional seismic waveform data processing in order to improve the accuracy and efficiency of seismic measurements.

The limitations of conventional waveform data processing techniques noted in the preceding are not intended to be exhaustive but rather are among many which may reduce the effectiveness of previously known techniques. The above should be sufficient, however, to demonstrate that methods and systems for acquiring and processing seismic data existing in the past will admit to worthwhile improvement.

SUMMARY OF THE DISCLOSURE

Embodiments disclosed herein provide methods and systems for seismic waveform data processing, such as microseismic waveform data. In particular, some embodiments of the present disclosure provide methods and systems for microseismic data acquisition and analysis using a general receiver distribution and taking into consideration polarization information for the acquired signals. In some aspects of the present disclosure, a 3D grid search is applied that is based on modeled travel times and polarizations. For example, polarization angles are used within a probability function of the co-linearity of modeled and locally estimated polarization vectors.

In other aspects of the present disclosure, a gradient based inversion algorithm is utilized in combination with one or more grid based searches to refine and improve initial event location estimates based on coarse grid searching. Aspects disclosed herein may be applied on dataset that are recorded with an array of three-component (3C) receivers deployed in, for example, a deviated or horizontal well.

Aspects of the present disclosure include methods and systems for microseismic data processing using an algorithm that provides an automatic solution for event detection and location in real-time when the receiver array is distributed in a deviated or horizontal well. In some aspects, the techniques of the present disclosure are based on an estimation of signal-to-noise ratios (SNR) at modeled direct arrival times for P- and S-waves. The techniques include introducing the required polarization angle information within a probability function.

In aspects of the present disclosure, techniques for seismic waveform processing utilize, in part, a grid search based approach that depends on the grid location and dimensions. In one possible embodiment, event location is estimated based on acquired waveform signals, for example, the SNR data and waveform polarization observed across the receiver distribution, such as a non-vertically distributed array of seismic sensors.

According to one exemplary embodiment disclosed herein, a method of detecting and locating a microseismic event is disclosed. The method includes providing an estimate of a velocity model for a formation; estimating a volume of space in which the event will most likely occur; dividing the volume into a plurality of sub-volumes; receiving data of a microseismic event with at least a first and a second seismic sensor located on a tool in a wellbore; approximating a location of the event in the volume to determine in which sub-volume the event occurred; and determining a more precise location of the event within the sub-volume utilizing the signals.

According to yet another exemplary embodiment disclosed herein, a method of detecting and locating a microseismic event is disclosed. Aspects of the method include generating a 3D spatial sampled volume of potential hypocenter locations; generating a look-up table for the P and S transit-times as well as the P and S-waves azimuth and dip angles at each grid node in the volume; computing the multicomponent covariance matrix while reading waveforms; storing the largest eigenvalue and its associated eigenvector as a function of time; applying an STA/LTA time-picker to the principal component; computing and storing the measured azimuth and dip for the eigenvector; computing CMM for a decimated grid; storing for every time sample the largest value of CMM when applied to the coarse grid; obtaining a rough estimate of a detected microseismic event with an origin time; determining a refinement of the event origin-time and spatial coordinates by applying a grid-search to the CMM objective function over a finer sampling of the solution domain; obtaining an event location and origin-time along with a set of model travel-times and estimated incidence azimuth and dip angles; obtaining refined arrival-time estimates and associated estimates of measured incidence azimuth; conducting a grid search of the Geiger residual-function; using the returned result as an initial guess in a gradient search for the minimum of the Geiger residual function; and estimating the final location of the microseismic event.

According to yet another exemplary embodiment of the present disclosure, a system of processing waveform data is provided. The system includes an acoustic tool comprising at least a first and a second seismic sensor; a computer in communication with the acoustic tool; and a set of instructions executable by the computer. The instructions, when executed, receive data of an event with at least the first and the second seismic sensor located on the tool in a wellbore; approximate a location of the event in a volume of space comprising a plurality of sub-volumes to determine in which sub-volume the event occurred; apply a first grid search to obtain spatial coordinates and origin time of the event based on the approximate location of the event; apply a second grid search to derive a residual function at nodes of a finer grid; apply a gradient search of the residual function to optimize the location of the event; and determine a more precise location of the event based on the gradient search. In some aspects disclosed herein, the system may include a distributed array of seismic sensors having a non-vertical configuration and deployed in one or more shallow or deep wellbores traversing subterranean formations. The seismic sensors may be configured for acquiring waveform data from microseismic events at locations away from the tool.

BRIEF DESCRIPTION OF THE DRAWINGS

The accompanying drawings illustrate certain embodiments and are a part of the specification. Together with the following description, the drawings demonstrate and explain some of the principles of the present disclosure.

Figure 1:
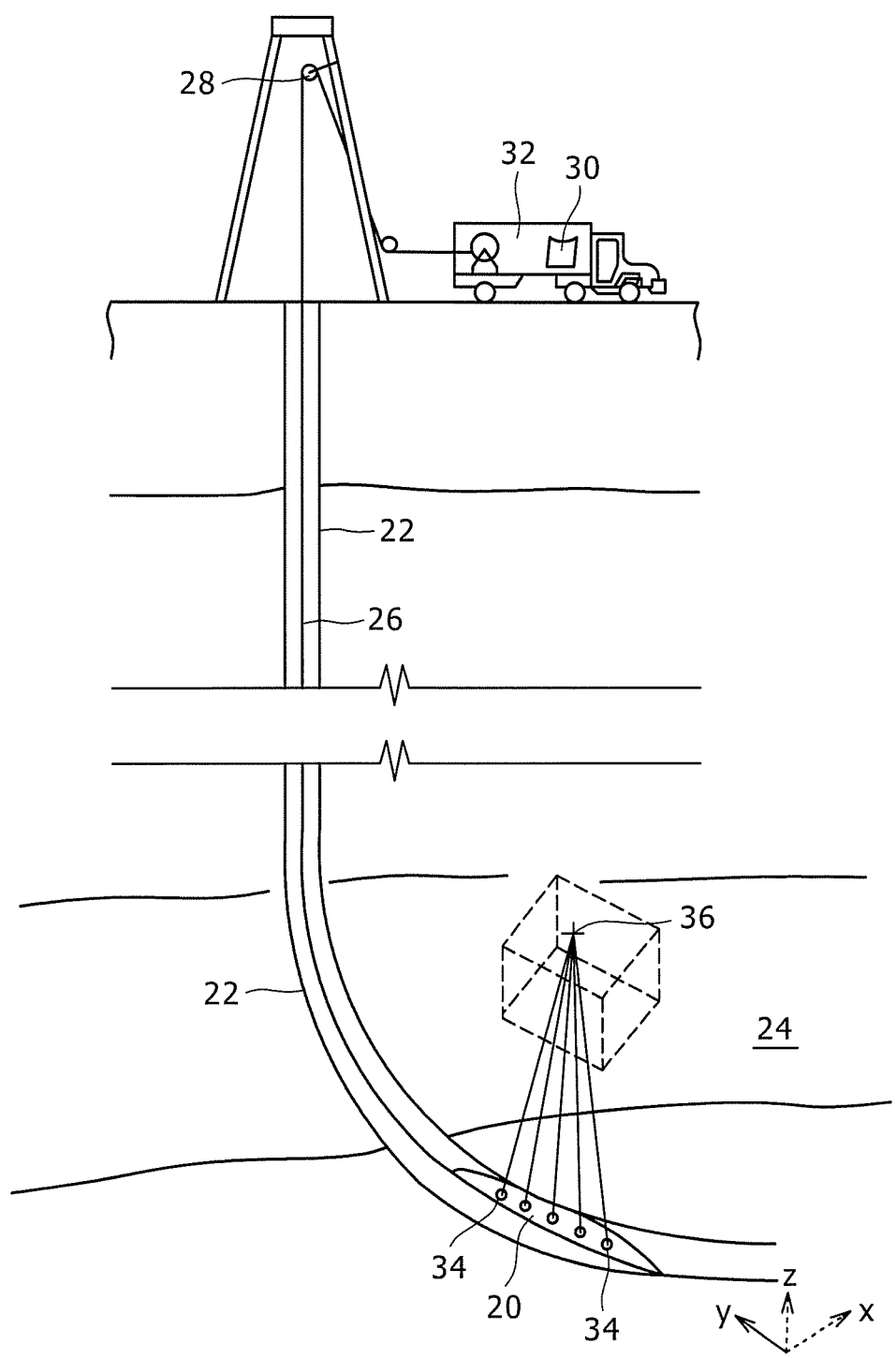
FIG. 1 is a side sectional view of one exemplary application—a tool receiving signals in a deviated/horizontal wellbore—to which the present disclosure may be applied.

While the principles described herein are susceptible to various modifications and alternative forms, specific embodiments have been shown by way of example in the drawings and will be described in detail herein. However, it should be understood that the disclosure is not intended to be limited to the particular forms disclosed. Rather, the disclosure includes all modifications, equivalents and alternatives falling within the scope of the appended claims.

DETAILED DESCRIPTION

So that the above recited features and advantages of the present invention can be understood in detail, a more particular description of the invention, briefly summarized above, may be had by reference to the embodiments thereof that are illustrated in the accompanied drawings and graphs. It is to be noted, however, that the drawings illustrate only typical embodiments of this invention and are therefore not to be considered limiting of its scope, for the invention may admit to other equally effective embodiments.

FIG. 1 is a schematic illustration of one exemplary embodiment and one exemplary method of deployment, showing a system including a downhole tool that may be used in conjunction with the methods described herein. The system of FIG. 1 depicts a seismic tool 20 disposed in a borehole 22 adjacent a formation of interest 24. The tool 20 may be deployed using conventional logging cable 26, or by another method of deployment that is consistent with the principles described herein. For example, known modes of deployment such as wireline, coiled tubing, slick line, among others, may be employed according to the principles described herein or may be used in conjunction with a permanent or semi-permanent seismic monitoring system. Furthermore, the disclosure herein contemplates applications in well services, underground gas and waste storage, hydraulic fracture monitoring, reservoir and formation monitoring, and similar areas that require seismic source location. Referring again to FIG. 1, the cable 26 may be looped through a pulley 28 of an oilrig in a known conventional arrangement. The cable 22 also may include transmission lines for data transmission to and from the surface. In this, signals may be transmitted electrically or optically to and from a processing unit 30 that may be disposed in a service truck 32, or by any other conventional arrangement.

The tool 20 includes a plurality of receivers 34 that may be disposed in the tool 20 in various configurations, including being disposed vertically along the length of the tool 20 or along the y-axis as shown in FIG. 1. The tool 20 may consist of individual sensor carriers, interconnected by support/telemetry cables, and widely separated along the borehole axis. Several tools may be deployed in multiple boreholes. The formation of interest 24 will also include a plurality of points of interest 36 (e.g. fractures in the formation) that are the focus of the present application.

The applicants have proposed two related approaches for the processing and analysis of seismic waveform data that are acquired in deviated or horizontal boreholes with, for example, a distributed array of seismic sensors having, for example, a non-vertical configuration and deployed in one or multi-well operations. Aspects of the techniques disclosed herein are applicable to real-time 3D processing of waveform data. In this, the principles disclosed herein provide improved detection and localization results of seismic events such as microseismic events that are generated in, for example, reservoir stimulation and management operations including in connection with Hydraulic Fracture Monitoring (HFM) and Reservoir Monitoring (RM) services.

As used herein, a distributed receiver array refers to receivers that are positioned or distributed in a non-vertical configuration, i.e., all the receivers are not in a plane that contains the center of a target grid. Nor are the receivers assumed to be collinear or coplanar. As used herein, "CMM2D" refers to planar type receiver configurations in which the receivers and the event location are assumed to be coplanar, such as described in the aforementioned '675 patent, and "CMM3D" refers to the techniques of the present disclosure that remove the planar configuration limitation. In this, "CMM2D" relates to vertically aligned receivers and the associated processing, whereas "CMM3D" relates to a distributed array, i.e., a non-vertical array of receivers, and the associated processing of the present disclosure.

Figure 2:
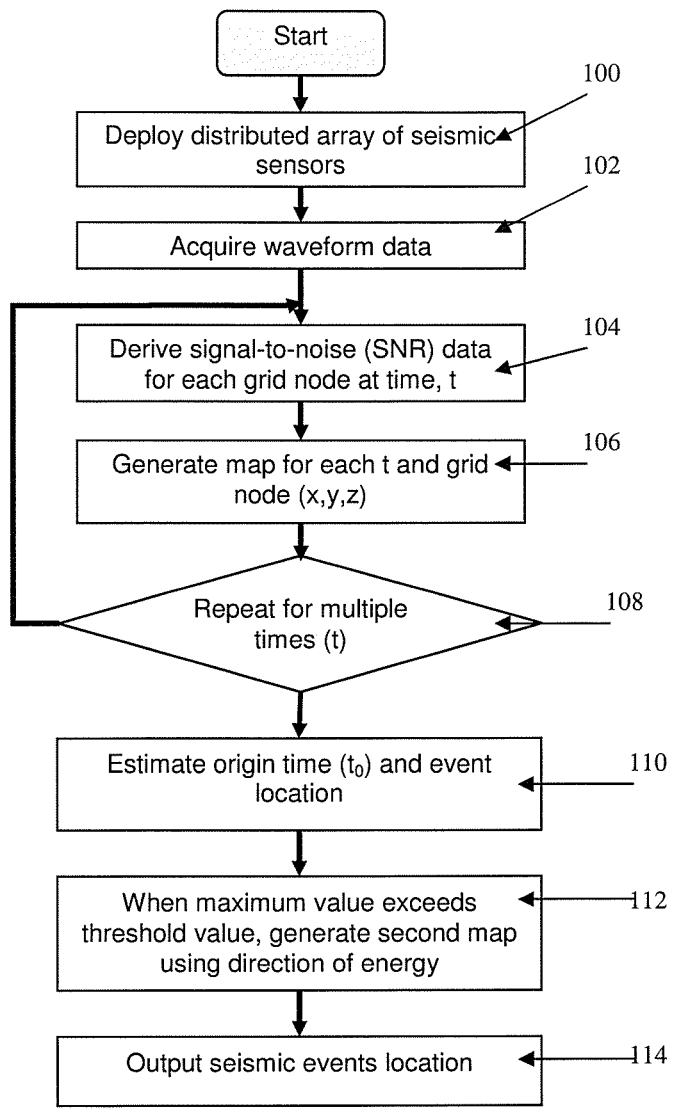
FIG. 2 is a flowchart depicting one possible embodiment of techniques disclosed herein for the processing and analysis of seismic waveform data.

Referring to FIG. 2, as previously discussed above, methods and systems for microseismic data processing disclosed herein utilize an algorithm that provides an automatic solution for event detection and location in real-time with a distributed receiver array in, for example, a deviated or horizontal well. Note Steps 100 and 102 in FIG. 2. In some aspects, signal-to-noise ratios (SNR) are estimated for each grid node at time, t (Step 104) at modeled direct arrival times for P- and S-waves. Origin time, $t_0$, and event location are estimated (Step 110) with the processing repeated for multiple times, t, to generate a map for each t and grid node (x,y,z) (Steps 106 and 108). When a maximum value exceeds a predetermined threshold value, a map is generated using the direction of the incoming signals (Step 112) to output one or more locations of seismic events (Step 114). Polarization angle information is introduced within a probability function measuring the co-linearity of modeled and local estimates of P-wave polarization vectors. Techniques disclosed herein may be applied in real-time to data recorded, for example, by an array of three-component (3C) receivers deployed within a deviated well.

In one embodiment, the techniques proposed herein for seismic waveform processing utilize, in part, a grid search based approach based on grid location and dimensions. In one possible embodiment, event location is estimated based on acquired waveform signals, for example, the SNR data and waveform polarization observed across the receiver distribution, such as a distributed array of seismic sensors.

In another related embodiment for signal processing, a detection and localization method is proposed that involves multiple stages. In one exemplary embodiment, the proposed method for microseismic event detection and localization has several stages of processing which differ in their quantification of mismatch between model and measured values, their choice of objective function, and the procedure used to minimize or maximize that function.

A first stage is based on a map migration technique which does not require time picking, but does use continuous function forming to produce a measure of SNR, the signal-to-noise ratio, as a function of time for each sensor. It also uses a continuous estimate of waveform polarization versus time. A second stage performs guided time picking, and uses discrete time picks along with associated polarization estimates to compute measured versus modeled data error residuals. The error residual objective function is then minimized in several sub-stages to search over the hypocenter/origin-time domain.

Figure 3:
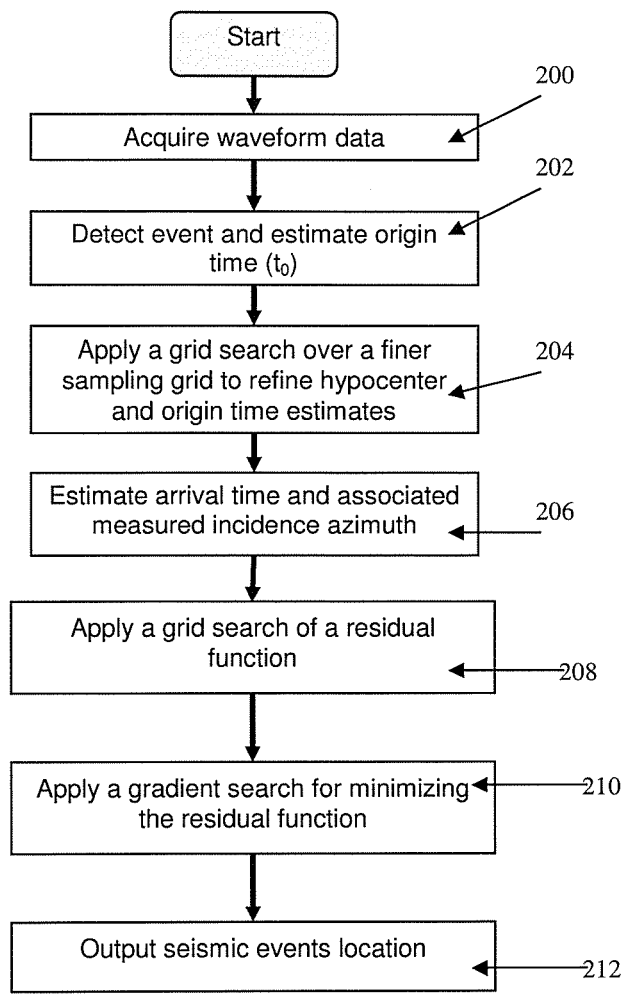
FIG. 3 is a flowchart depicting another possible embodiment of techniques disclosed herein for the processing and analysis of seismic waveform data.

Referring to FIG. 3, in one possible embodiment of the present disclosure waveform data are acquired (Step 200), and are processed to detect an event and estimate origin time $t_0$ (Step 202). A grid search may be applied, based on the detected event, over a finer sampling of the solution domain (Step 204) to refine the hypocenter and origin time estimates. These can be used to derive estimated arrival times and associated measured incidence azimuth (Step 206). A second grid search is applied over a residual function (Step 208) followed by a gradient search for minimizing the residual function (210) to estimate the location of seismic events (212).

Figure 4:
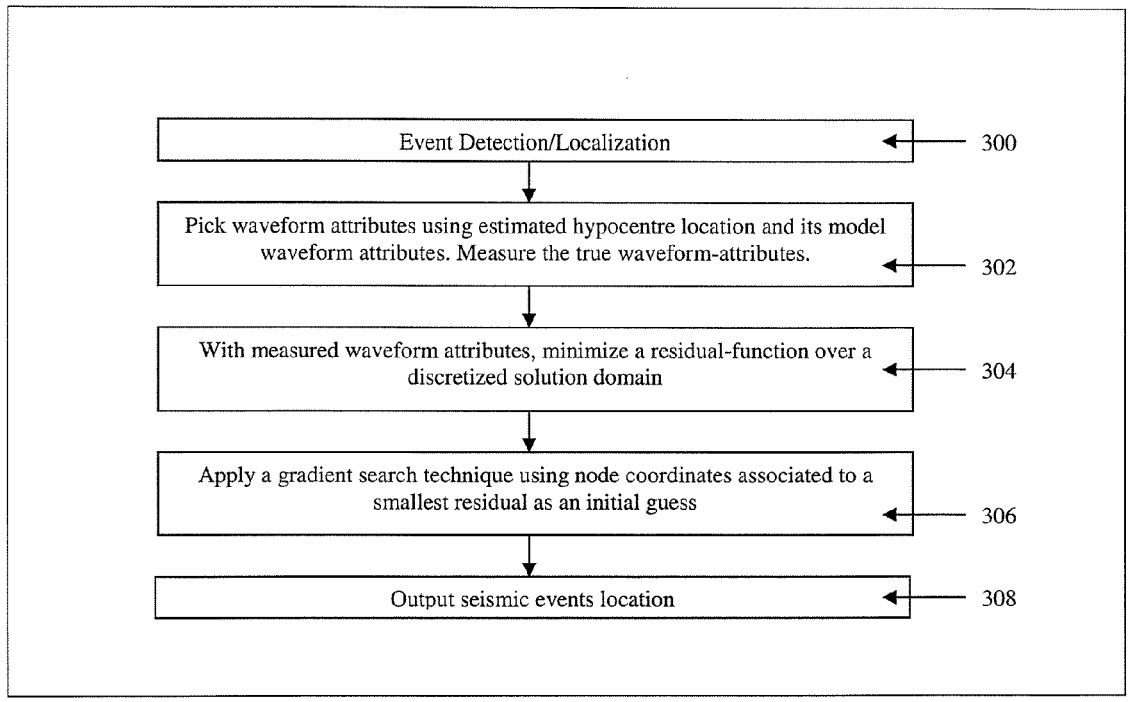
FIG. 4 is a flowchart depicting a general processing flow of the real-time microseismic event detection/localization algorithm disclosed herein.

As depicted in the flowchart of FIG. 4, and discussed in detail herein, certain embodiments of the event detection/localization processing 300 of the present disclosure include determining waveform attributes using the estimated hypocenter location and its associated model waveform attributes, and then measuring the true waveform-attributes (Step 302); with the measured waveform attributes, minimizing a residual-function over a discretized solution domain (Step 304); applying a gradient search technique using node coordinates associated to a smallest residual as an initial guess (Step 306); and outputting seismic event locations (Step 308).

Figure 5:
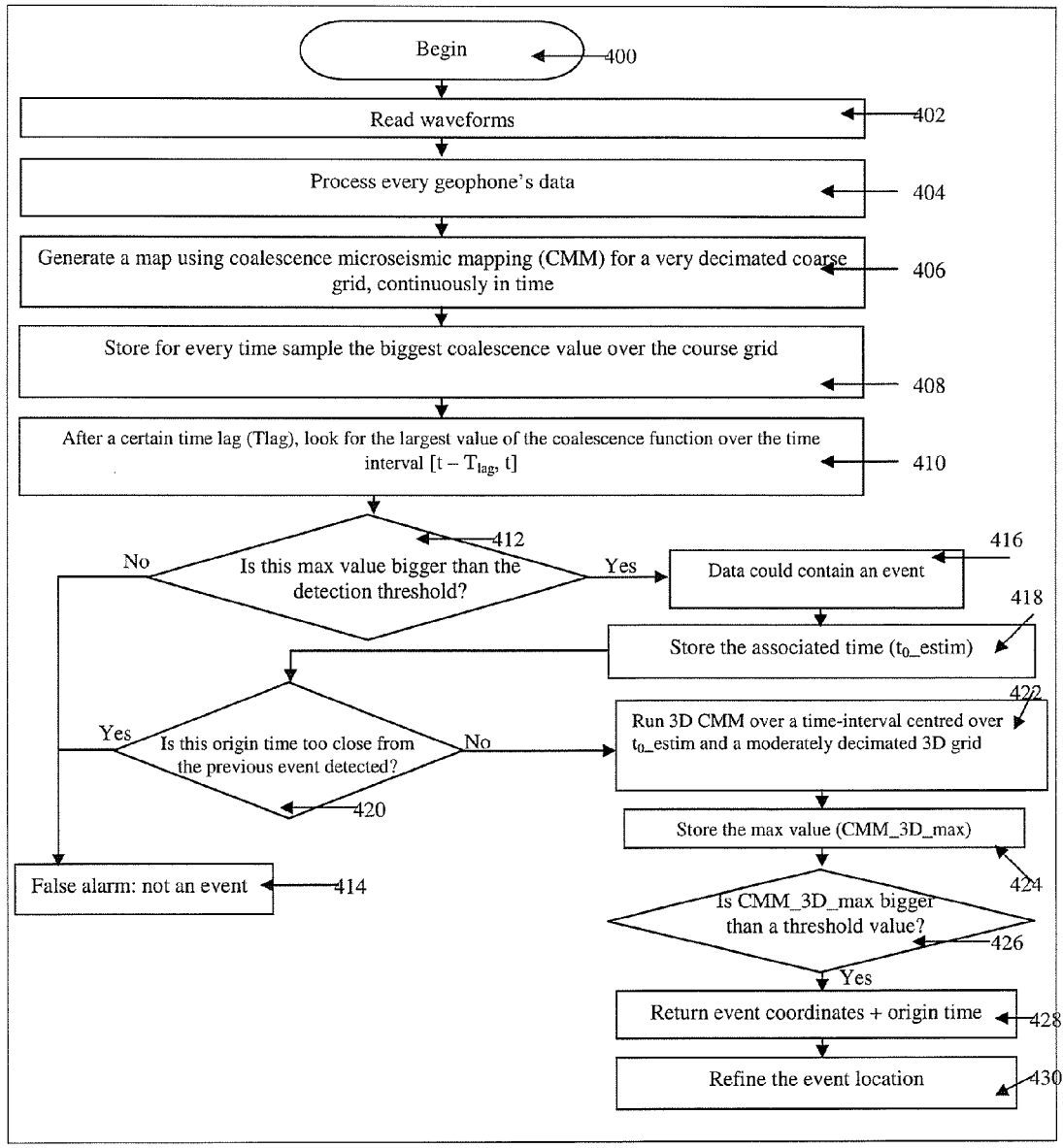
FIG. 5 is a flowchart of a processing algorithm with emphasis on a detection and localization portion of the algorithm.
Figure 6:
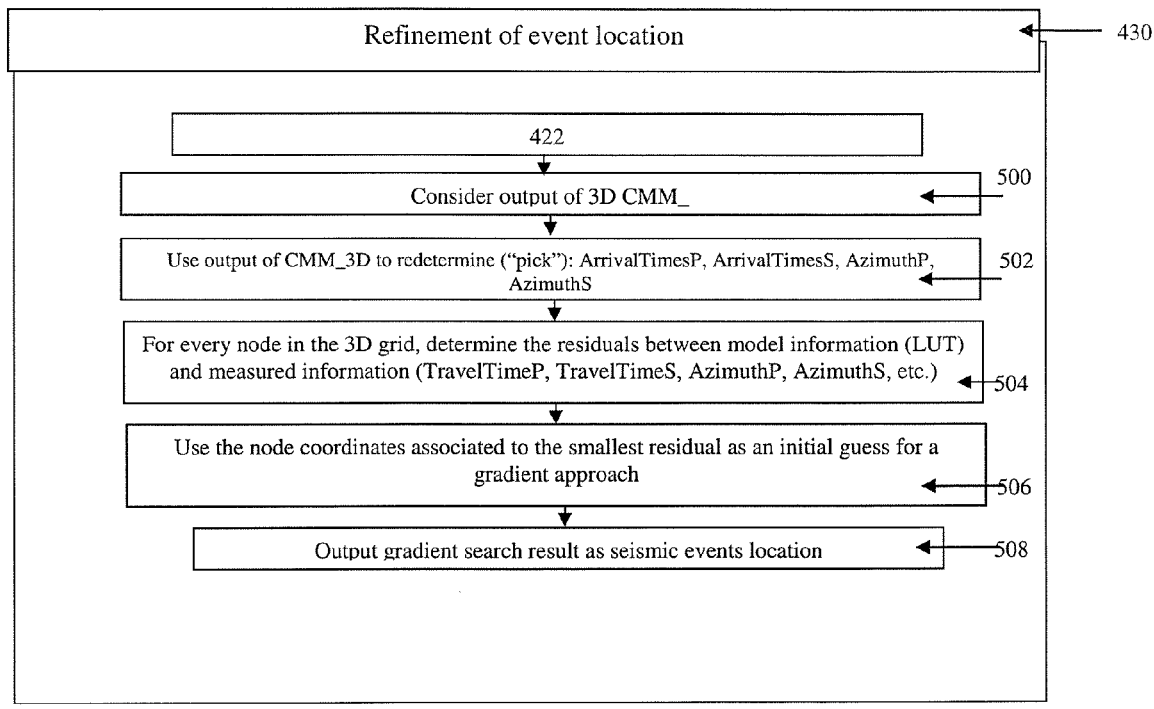
FIG. 6 is a flowchart of a processing algorithm with emphasis on a location refinement portion of the algorithm.

FIG. 5 depicts in a more detailed flowchart the processing associated with event detection and localization, and FIG. 6 depicts the processing flowchart for refinement of event location that is derived based on the processing of FIG. 5.

Hereinafter, a description is first provided of some exemplary signal processing techniques and detection/localization techniques that are utilized in the proposed detection and localization techniques according to the present disclosure, which are described in more detail thereafter.

Descriptions of Signal Processing Techniques

Time Picking

Waveforms from an event generally differ between geophones. This makes multi-channel time picking difficult. Most methods in the literature time-pick on a single-channel basis. A popular method for arrival-time picking on a single-channel basis uses the Short Time Average/Long Time Average (STA/LTA) operator described by Baer & Kradolfer which utilizes second order moments. The generalisation of this operator with higher-order statistics (e.g. ratio of exponents of moments of even orders) is an alternative to the STA/LTA. Other operators such as change-point estimation using linear prediction and the Bayesian/Akaike Information Criterion may also be employed and alternative methods for picking time include:

Polarization based techniques: orthogonality of the polarization vectors at the compressional and shear arrival-times, analysis of the different ratios between eigenvalues of the three-component covariance matrix computed continuously in time and their generalization to multi-channel techniques.

Analysis of the waveform content: peaks, troughs, zero-crossings, amplitude/frequency variation, amplitude/frequency comparison to a threshold value, among others, and their generalization to multichannel techniques.

In some aspects, some embodiments of the current method apply the STA/LTA operator to the largest principal component of the waveforms for two reasons: computational run-time is considerably improved; the data quality is higher, i.e. the principal component signal is smoother and, in the testing that has been conducted, has shown a higher signal-to-noise ratio than the Hilbert envelope. However, the use of other envelopes (e.g., the "Hilbert envelope", the Baer and Kradolfer envelope, sum of the squared amplitudes of the seismograms, among others) is not excluded. The principal components are computed using Principal Component Analysis (PCA) applied to the three-component (3C) waveforms of each geophone. In particular, the principal components (i.e. the eigenvalues and associated principal eigenvectors) are continuously computed in time using windowed data segments.

When applied to the principal component data, the STA/LTA operator returns a flat curve with sharp peaks occurring at the P and S-arrivals in the time-domain. Such a curve presents similarities from receiver to receiver. By construction, the STA/LTA signal is hence very adequate for high-resolution time-delay estimators such as cross-correlation.

Polarization

Polarization is used to estimate the component incidence-angles of the arriving wave. Estimating polarization can be done in the frequency, time or wavelet domains. A time-domain approach for measuring incidence angles may be used for real-time HFM purposes.

In order to measure polarization for a three-component geophone, the covariance matrix of the three waveforms components is computed over a time-window. For the case of the P-wave in isotropic materials, the direction of arrival is given by a principal eigenvector of the covariance matrix. In anisotropic materials corrections are made to determine the ray direction vector from the P-wave polarization. The incidence-angles are subsequently deduced from this vector.

Time-domain polarization estimates may be based on the use of real signals or analytic (complex) signals. Analytic signals are more stable at amplitude zero-crossing and can provide instantaneous polarization. However, determination of real incidence angles from the eigenvectors of the covariance matrix of multi-component analytic signals requires additional assumptions and is computationally more costly. In testing, it was found that there is little practical difference between incidence angles computed from real or analytic signals. For the purposes of real-time calculations, time-domain polarization estimation based on the use of real rather than complex signals is preferable, but the present technique accommodates polarization computation by either technique. Furthermore, additional processing steps which improve the final estimate of polarization vectors and incidence angles are:

(a) Picking Incidence-Angles and Polarization Vectors: Outlier Removal

In order to obtain stable estimates of polarization angles it is useful to reduce sensitivity to noise by combining estimates made over a time interval around the first arrival of each waveform phase. The alpha-trimmed mean operator returns an average centred on the median value over this time interval. Depending on the choice of alpha, the returned value can vary from the median value (i.e. maximum rejection of potential outliers) to the average value of all the samples (i.e. zero rejection of samples when averaging).

(b) Removal of Direction of Uncertainty Provided by Polarization

When measuring incidence-angles, an uncertainty of the order of 180 degrees can influence the results. This uncertainty is due to the nature of the method used for estimating angles. Angles are computed from eigenvectors provided by the PCA. It is known that two vectors pointing in opposite directions are eigenvectors of the same matrix associated to the same eigenvalue. Two techniques may be used in order to remove this uncertainty:

1. Prior knowledge regarding the area of interest is used to "manually" set the direction to which these vectors should point.

2. A receivers' network hull is defined. A convex hull or a cross-section of the beam of rays for instance could be considered. Every receiver presents two unit polarization-vectors pointing to two opposite directions. If the receivers' network hull is "propagated" following the true polarization vectors (i.e. toward the source), then its size should shrink as it gets closer to the source location. This method needs to be applied to an adequately chosen subset of the receiver network.

Main Optimization Techniques

The event localization problem is an inversion problem. It is a search for a best-match between a set of measurements made on real data and the associated model values. Hence, provided that the model chosen is consistent, the event localization is defined as an optimization problem. The "match-function" between model and measurements is called a residual-function or error-function. However, the search method used for identifying the extremum depends on the residual-function behaviour. The main classic optimization techniques that can be considered include: (a) Grid search; (b) "Beta"-section; (c) Gradient; (d) Simplex; (e) Probabilistic algorithms.

(a) Grid search: this technique is reliable as the function is evaluated over its entire domain of definition. The result returned will be the global minimum if the domain is sampled finely enough.

(b) "Beta-section" methods: sometimes referred to as multi-resolution method (i.e. family of bi-section and golden-section methods and their generalization to multi-variable problems such as "quadtrees", etc.).

(c) Gradient: the gradient strategy often offers the most attractive trade off between run-time and accuracy. Depending on the use of the Hessian and its possible approximation, these methods are often referred to as "Newton" or "quasi-Newton" methods. In addition to the "Newton" method, the "Steepest Descent", "Marquardt-Levenberg and Trust-Region", and "conjugate-gradient" procedures also may be referred to.

(d) Simplex: the Nelder-Mead simplex approach and its variants are the key references. The present disclosure proposes an alternative to the original nonlinear simplex. Based on a line-search, adaptive steps may be used in order to improve the convergence speed of the algorithm. These steps will be computed respectively at the so-called stages of "Contraction", "Expansion" and "Reflection". In addition to the line-search, the use of the concept of adaptive search-directions is introduced herein. The search-directions for the three named stages can be defined by the selection of a search of a direction in which the line-search will operate.

(e) Probabilistic: Probabilistic algorithms include the Monte Carlo and the metaheuristics techniques. The most popular of these algorithms are probably the "simulated annealing" and "genetic algorithms". The "tabu search", "hill climbing", "ant colony" and "particle swarm" can also be considered.

Descriptions of Detection/Localization Techniques

In one exemplary embodiment, a proposed method for microseismic event detection and localization has several stages of processing which differ in their quantification of mismatch between model and measured values, their choice of objective function, and the procedure used to minimize or maximize that function. This section describes the techniques used in those stages and the order in which they are used in the new processing flow. The following section gives a description of the flow of the multi-stage processing.

The first challenge in microseismic data processing is the detection of micro-earthquakes (microseismic events) in the continuous flow of recorded data. Due to the lack of prior knowledge about the arrivals-moveout, detection is often based on the use of the STA/LTA operator described earlier. Reliable techniques manage to proceed on a multichannel basis. The CMM technique has been employed effectively for the purpose of multi-channel event detection, and is included in the proposed workflow.

When an event is detected, its hypocenter needs to be located. The fundamental principle consists of finding the event origin in space and time yielding the best match between the measurements made and the corresponding computed model values. The algorithm developed by Geiger in 1912 may be used for this purpose. This disclosure proposes using it as part of the finishing stages in a multi-stage processing approach. As such it can be used in real-time with improved reliability, and can be used to refine the initial hypocenter locations determined using CMM. An extra penalizing-term is added to the residual-function. Such a term can be based on prior knowledge about the sought solution location or properties. The use of such a term penalizes the consideration of candidate hypocenters with undesired properties. A list of properties that can be used to discard such candidate is given by Spatial position: based on the distance of the considered candidate to a given location (e.g. "check-shot" location) or a region, a value is returned to penalize the consideration of the candidates that are too far from the area of interest.

Waveform content: Waveform content such as the RMS, polarization type, polarization vectors, among others, may be considered to discard candidates.

The use of such a constraint has previously been described within probability based event location algorithms (Bayesian) which employ grid searching. Here they are included as part of gradient search algorithms.

Coalescence Microseismic Mapping (CMM)

Considering the issues related to time-picking in the Geiger algorithm, an alternative automatic solution, Coalescence Microseismic Mapping (CMM), was developed by Drew et al. (see the '675 patent). It detects and localizes microseismic events in real-time. Time-picking is not required anymore as the algorithm proceeds simultaneously to perform detection and localization. Moreover, CMM uses a variant of delay-and-sum beam-forming for detection purposes. Hence the method is very robust to noise.

Figure 7:
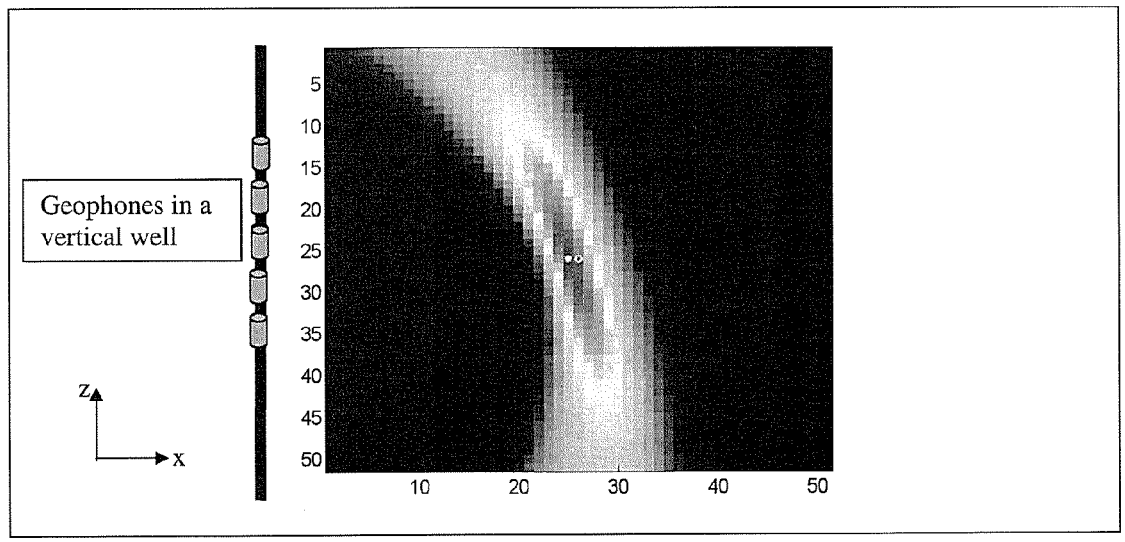
FIG. 7 is a CMM2D map of an objective function in a vertical plane (x, z)
Figure 8:
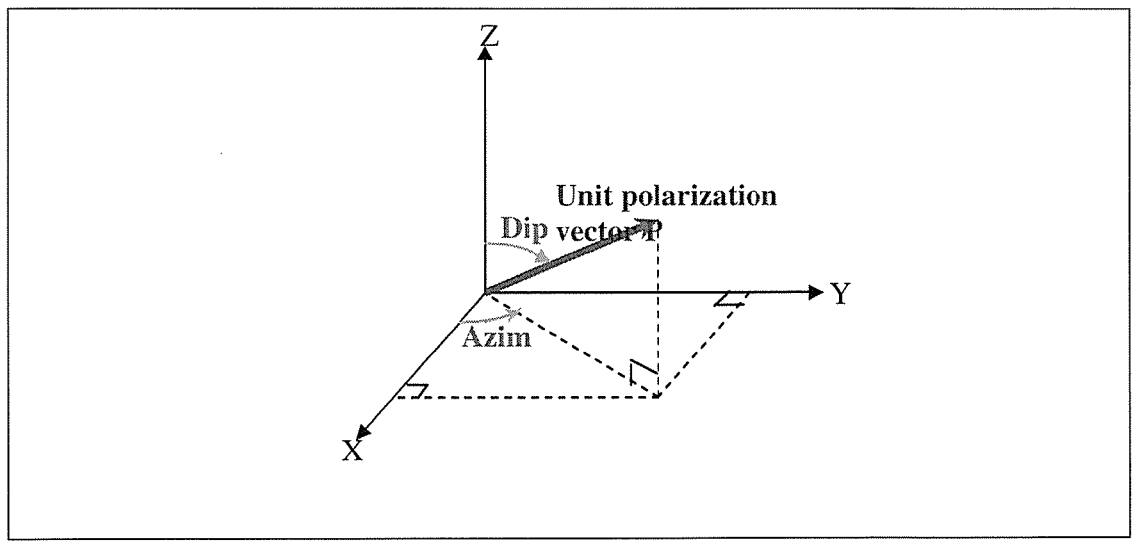
FIG. 8 is an illustration of a polarization vector and incidence angles.

In order to run in real time, CMM makes use of symmetry properties. The velocity models that are currently in use are often one-dimensional vertical anisotropic models. If the set of geophones is assumed to be vertical, then the localization problem presents an interesting symmetry around the vertical axis. Instead of localizing the hypocenter in a 3D space, it is possible to locate it in a vertical plane first, based on this symmetry property. The purpose is to get an estimate of depth and radial distance of the event location to the vertical array of multicomponent geophones (note FIG. 7). The final event location is therefore obtained by rotating the considered plane around the vertical axis. The rotation angle is given by the azimuth of the P-waves (average of the measured azimuths over the geophones). The detection/localization is defined as the maximization of a three-variable objective function. These variables are origin-time, radial distance to the geophones-array and depth of the event. The search of maximum is based on the grid search. The returned maximum corresponds to the event spatial coordinates and origin-time.

The CMM algorithm is a combined detection/localization scheme in which a continuous input data stream (rather than a few discrete picked data time points) are mapped into hypocenter/origin time candidates using modelled data values. It is sometimes referred to as "model driven" in that detection as well as localization depends on the match between measured and modelled data. Its location accuracy is controlled by the solution domain sampling (gridding of the vertical plane (x, z) at discretized time-intervals). For instance, a densely sampled plane allows accurate mapping but is slow to scan. A compromise needs to be found between location accuracy and algorithm run-time.

The beamforming applied by CMM differs in several ways from simple waveform, delay and sum beamforming. Firstly, it does not operate on the waveforms directly, but on their STA/LTA transforms. Secondly, the delayed and summed characteristic function is formed from a product of STA/LTA and other factors. The objective function obtained is subject to a constraint of orthogonality between polarization vectors measured at the P and S-waves arrival-times. Equation (1) describes the CMM objective function at a candidate "location" (x, z, t):

$$CMM2D(\vec{x}, t) = \sum_{rec} [STALTA_{rec}(t + TT_P^{model}(\vec{x}, rec)) \cdot$$

$$STALTA_{rec}(t + TT_S^{model}(\vec{x}, rec)) \cdot FP_{rec}(\vec{x}, t)],$$

where $\vec{x}=(x, z)$, $(x, z, t)$ is a candidate "location" (i.e. hypocenter and origin-time); $TT_P^{model}$ ($TT_S^{model}$) is the P-wave (S-wave) traveltime from $\vec{x}$ to the considered receiver location; and $$FP_{rec}(\vec{x}, t) = 1 - \overline{PolarizVector_{rec}(t + TT_P^{model}(\vec{x}, rec))} \cdot$$

$$\overline{PolarizVector_{rec}(t + TT_S^{model}(\vec{x}, rec))},$$

where rec=receiver index, 0<rec<(N+1), N=number of receivers, and $$\overline{PolarizVector_{rec}(t + TT_P^{model}(\vec{x}, rec))}$$

is the polarization vector of the data at the model P-wave arrival-time for this candidate hypocenter, origin-time and receiver position.

Other possible CMM objective functions include:

$$CMM(\vec{x}, t) = \sum_{rec} \prod_{i=1}^{Nfac} F_i(\vec{x}, t, rec)$$

$$CMM(\vec{x}, t) = \prod_{rec} \prod_{i=1}^{Nfac} F_i(\vec{x}, t, rec)$$

$$CMM(\vec{x}, t) = \sum_{rec} \left( \sum_{i=1}^{Nfac} (F_i(\vec{x}, t, rec))^{p1} \right)^{p2},$$

where: $Nfac$ = number of factors selected.

$$F_1(\vec{x}, t, rec) = P\left[(STALTA_{rec}(t + TT_P^{model}(\vec{x}, rec)))^{n1}\right]$$

$$F_2(\vec{x}, t, rec) = P\left[(STALTA_{rec}(t + TT_S^{model}(\vec{x}, rec)))^{n2}\right]$$

$$F_3(\vec{x}, t, rec) = P\left[(FP_{rec}(\vec{x}, t))^{n3}\right]$$

$$F_4(\vec{x}, t, rec) = P\left[(FAzimP_{rec}(\vec{x}, t))^{n4}\right]$$

$$F_5(\vec{x}, t, rec) = P\left[(FDipP_{rec}(\vec{x}, t))^{n5}\right]$$

$$F_6(\vec{x}, t, rec) = P\left[(FAzimS_{rec}(\vec{x}, t))^{n6}\right]$$

$$F_7(\vec{x}, t, rec) = P\left[(FDipS_{rec}(\vec{x}, t))^{n7}\right],$$

where $(\vec{x}, t) = (x, y, z, t)$ is a candidate "location"; and $$FP_{rec}(\vec{x}, t) = \text{polynomial of: } 1 - \overline{PolarizVector_{rec}(t + TT_P^{model}(\vec{x}, rec))} \cdot$$

$$\overline{PolarizVector_{rec}(t + TT_S^{model}(\vec{x}, rec))}$$

$$FAzimP_{rec}(\vec{x}, t) =$$

$$P\left[|Azimuth_{rec}^{measured}(t + TT_P^{model}(\vec{x}, rec)) - Azimuth_{rec}^{model}(\vec{x})|^{n8}\right]$$

$$FDipP_{rec}(\vec{x}, t) =$$

$$P\left[|Dip_{rec}^{measured}(t + TT_P^{model}(\vec{x}, rec)) - Dip_{rec}^{model}(\vec{x})|^{n9}\right]$$

$$FAzimS_{rec}(\vec{x}, t) =$$

$$P\left[|Azimuth_{rec}^{measured}(t + TT_S^{model}(\vec{x}, rec)) - Azimuth_{rec}^{model}(\vec{x})|^{n10}\right]$$

$$FDipS_{rec}(\vec{x}, t) =$$

$$P\left[|Dip_{rec}^{measured}(t + TT_S^{model}(\vec{x}, rec)) - Dip_{rec}^{model}(\vec{x})|^{n11}\right]$$

$$P(x) = \sum_{i=1}^{\infty} a_i \cdot x^i, \text{ where } \forall i \in N, \ a_i \in R$$

where
rec=receiver index, 0<rec<(N+1), N=number of receivers;
p1, p2, n1, n2, n3, n4, n5, n6, n7, n8, n9, n10 and n11 are real numbers not all equal to zero;
w1, w2, w3, w4, w5, w6 and w7 are real numbers referred to as weighting factors;
α is a unitless weighting scalar (so the cosine operator is applied to angles);
$TT_P^{model}$ ($TT_S^{model}$) is the P-wave (S-wave) traveltime from to the considered receiver location. The overbar in FPrec indicates a vector quantity.

It is noted that for either P-waves and/or S-waves, the ray vector at the receiver is determined from the particle motion polarization. For anisotropic models, the relation between ray-vectors and polarization depends functionally on the velocity model and the angle of incidence. For S-waves, additional measurements or processing may be required to provide an estimate of vertical phase velocity in order to estimate the ray direction.

The limitation of CMM or CMM2D remains its assumption about the geophone positions. If the geophones are located in a deviated, horizontal well, or simultaneously logged in two monitoring-wells, then the assumptions of the current implementation are violated. A solution with reduced constraints on the sensor positions is discussed in the section below titled "Proposed Detection and Localization Techniques".

Linearized Iterative Inversion ("Geiger")

The Geiger approach is based on defining and minimizing a residual-function in the least-square manner (see Equation 2 below). The search of the minimum is accordingly based on a gradient routine. Given a candidate hypocenter location and origin-time fi, the least-square residual-function is given by Equation (2):

$$R(\vec{h}) = \qquad (2)$$

$$\frac{1}{2}(model(\vec{h}) - measure)^T \cdot C_{measure}^{-1} \cdot (model(\vec{h}) - measure) + \text{Prior}(\vec{h}) =$$

$$\frac{1}{2} r^T \cdot C_{measure}^{-1} \cdot r + \text{Prior}(\vec{h})$$

where $C_{measure}^{-1}$ represents the inverse of the weight matrix (e.g. covariance matrix) and "prior" is a penalisation term that can, for example, be provided by the Bayesian theory.

The minimization of the residual-function, defined in Equation (2), is based on the simultaneous minimization of the two terms of the equation. Minimizing the first term is often referred as a minimization of the $L_2$ norm. The first-term of Equation (2) depends on the choice of the norm used and the waveform attribute chosen. Depending on the selected norm, a different weighting may be applied. The first term is therefore strictly defined as a function of a norm assessing the misfit between modelled and measured values.

In Equation (2), "model" refers to any waveform attribute that may be modelled and measured. For example, it can refer to:
Travel-time of the P and S-waves.
Arrival-time of the P and S-waves.
Angles (azimuth, dip or any combination) of the P and S-waves.
Polarization vector (or any projection) of the P and S-waves.
Waveform amplitudes extracted over a window of the P and S-waves.
Waveforms phases of the P and S-waves.
Waveforms frequencies of the P and S-waves.
Full-waveforms.
Any combination of the previous mentioned parameters.

After measuring the selected parameters, the picked values are quality-controlled. For example, based on prior knowledge, a comparison of the values can be done from receiver to receiver. Another alternative consists of comparing the values between the P and S-waves for the set of receivers. Unexpected values of arrival-times, angles can therefore be detected and removed or corrected before proceeding to the minimization of the residual-function.

TABLE 1

Summary of a classic Geiger algorithm

First:

Choose a list of waveform attributes to be measured and modelled (e.g. arrival-times and ray incidence-angle azimuths and/or dips, for both P and S-waves).
Choose/define a mismatch quantifier between individual measure and model values.
Define an error-function from the sum of a residual-function and a penalizing term (e.g. a weighted least-squares function).
Choose an optimization technique (e.g. a gradient method).
Define an exit-condition for the search of extremum of the residual-function.
Input:

P and S velocity models.
Measured values of the waveforms' attributes (e.g. P and S arrival-times and ray incidence-angle azimuths and/or dips).
Receivers' spatial-coordinates.
Area of interest (spatial volume at a given time-interval).
Algorithm:

Search the minimum of the error-function in its domain of definition until the exit-condition is satisfied.

Although popular for its localization accuracy and its run-time, this type of algorithm presents issues. First, the waveform-attributes (e.g. arrival-times) need to be reliably picked which is a delicate task in real-time. Second, due to the optimization technique chosen, the location returned may not correspond to the true source location.

Proposed Detection/Localization Techniques

CMM is suitable for event detection due to its beam-forming and forward-modelling properties. When provided with accurate arrival-time estimates, the Geiger approach is more accurate in localization. Removing the assumption of geophone array verticality in CMM means that the objective-function needs to be maximized over a time-interval and spatial-volume (instead of a vertical plane). Proceeding to such a search in real-time is very challenging. It can nevertheless be achieved if the domain of solution is properly sampled and if an adequate optimization technique is applied. As the new problem does not present any symmetry, the objective-function (Equation (1)) needs to be modified. Incidence-angles (e.g. P-waves azimuth and/or dip) need to be included, as shown in Equation (3a) below. As a result, localization uncertainty is reduced. Other possible CMM objective functions have been previously defined above.

$$CMM(\vec{x}, t) = \sum_{rec} [Part1(\vec{x}, t, rec) \cdot Part2(\vec{x}, t, rec)] \quad (3a)$$

where:

$$Part1(\vec{x}, t, rec) = (STALTA_{rec}(t + TT_P^{model}(\vec{x}, rec)))^{n1} \cdot$$

$$(STALTA_{rec}(t + TT_S^{model}(\vec{x}, rec)))^{n2}$$

-continued $$Part2(\vec{x}, t, rec) = (FP_{rec}(\vec{x}, t))^{n3} \cdot (FAzimP_{rec}(\vec{x}, t))^{n4} \cdot$$

$$(FDipP_{rec}(\vec{x}, t))^{n5} \cdot (FAzimS_{rec}(\vec{x}, t))^{n6} \cdot (FDipS_{rec}(\vec{x}, t))^{n7},$$

$(\vec{x}, t) = (x, y, z, t)$ is a candidate "location", and $$FP_{rec}(\vec{x}, t) = 1 - \overrightarrow{PolarizVector_{rec}(t + TT_P^{model}(\vec{x}, rec))} \cdot$$

$$\overrightarrow{PolarizVector_{rec}(t + TT_S^{model}(\vec{x}, rec))}$$

$$FAzimP_{rec}(\vec{x}, t) =$$

$$|\cos[\alpha(Azimuth_{rec}^{measured}(t + TT_P^{model}(\vec{x}, rec)) - Azimuth_{rec}^{model}(\vec{x}))]|$$

$$FDipP_{rec}(\vec{x}, t) =$$

$$|\cos[\alpha(Dip_{rec}^{measured}(t + TT_P^{model}(\vec{x}, rec)) - Dip_{rec}^{model}(\vec{x}))]|$$

$$FAzimS_{rec}(\vec{x}, t) =$$

$$|\cos[\alpha(Azimuth_{rec}^{measured}(t + TT_S^{model}(\vec{x}, rec)) - Azimuth_{rec}^{model}(\vec{x}))]|$$

$$FDipS_{rec}(\vec{x}, t) =$$

$$|\cos[\alpha(Dip_{rec}^{measured}(t + TT_S^{model}(\vec{x}, rec)) - Dip_{rec}^{model}(\vec{x}))]|$$

where rec=receiver index; $0<\text{rec}<(N+1)$; N=number of receivers; n1, n2, n3, n4, n5, n6 and n7 are real numbers not all equal to zero; $\alpha$ is a unitless weighting scalar (so the cosine operator is applied to angles; $TT_P^{model}$ ($TT_S^{model}$) is the P-wave (S-wave) traveltime from $\vec{x}$ to the considered receiver location.

Note that for either P-waves and/or S-waves, the ray vector at the receiver must be determined from the particle motion polarization. For anisotropic models, the relation between ray-vectors and polarization depends functionally on the velocity model and the angle of incidence. For S-waves, additional measurements or processing may be required to provide an estimate of vertical phase velocity in order to estimate the ray direction.

Depending on the data quality, it is possible to use a different discrimination factor for the azimuth or dip angle values of both P and S-waves. For improved data quality, it is possible to use the following expressions:

$$FAngleP_{rec}(\vec{x}, t) = \quad (3b)$$
$$\exp[-\alpha \cdot (Angle_{rec}^{measured}(t + TT_P^{model}(\vec{x}, rec)) - Angle_{rec}^{model}(\vec{x}))^{2n}],$$

where $n$ is a positive number $$FAngleS_{rec}(\vec{x}, t) =$$
$$\exp[-\alpha \cdot (Angle_{rec}^{measured}(t + TT_S^{model}(\vec{x}, rec)) - Angle_{rec}^{model}(\vec{x}))^{2n}],$$

where $n$ is a positive number where: $\alpha$ is a positive factor controlling the discrimination sharpness. For real-data, such a factor needs to be carefully chosen. If $\alpha$ is too large, then good candidate locations may be excluded. Moreover, the STA/LTA factors may lose their predominance in the objective-function. On the other hand, if $\alpha$ is too small, then the opposite effect happens. Previously in application of the Bayesian approach, $\alpha$ has been set to the reciprocal of the angle measurement uncertainties. Depending on the choice of angle (i.e. dip or azimuth), "FAngleP" (S) can be an alternative to "FAzimP" or "FDipP" ("FAzimS" or "FDipS") in Equation (3a).

Even when provided with a pre-computed set of model values (i.e. "lookup" table), the applicants found that evaluating the objective-function of CMM at a candidate location was slower than evaluating a Geiger residual-function. Therefore, the algorithm presented in this disclosure takes into consideration this observation and reduces the number of evaluations of the CMM objective-function. As a first step, CMM is subsequently only evaluated on a coarse grid. As a second step, the Geiger residual-function instead of the CMM objective-function is computed at the nodes of a finer grid in order to be consistent with the third step in which the refinement of the location is obtained by the classic gradient-based Geiger algorithm. Thus the output location is returned after the minimization of the same ("Geiger") residual-function by two consecutive search-techniques: a grid search followed by a gradient procedure.

Due to its properties, CMM is used as an event detector and gross-location estimator. The location refinement is overall given by a Geiger minimized residual technique. The reason for such an approach is to be able to use CMM as a robust response to all the issues raised by the classic Geiger method. CMM is stable for detecting and locating events with a given resolution. Applicants recognized that when an event is detected and located with CMM, the modelled arrival-times can reliably be used to initiate accurate measurement of both arrival-times (picking) and associated angles of the picked wave type. Subsequently, the measured waveform attributes ought to be reliable as good approximations are already available. Therefore, the first two issues about detecting events and measuring arrival-times in the Geiger method are solved. The combination of a grid-search with a gradient approach will be referred to as a "stabilized Geiger" approach.

With the set of accurate arrival-times and incidence-angles, the techniques proposed herein then adopt a Geiger type of localization and improve the location provided by CMM. The third issue about the classic Geiger method is the convergence to the true solution. Due to the use of gradients, the solution may depend on the initial guess. This issue is solved when the classic Geiger algorithm starts from an initial guess close to the true solution. The objective-function of CMM is different from the Geiger residual-function; therefore these two functions may reach their extrema at different locations. Consequently, in order to be consistent in the optimization problem, a fine grid-search may be applied to the Geiger residual-function instead of the CMM objective-function. Run-time and consistency both justify the use of a grid-search procedure of the Geiger residual-function. As a result, a reliable initial guess is provided to the gradient method.

The current implementation of solution steps two and three (note above) minimizes the objective function given by Equation (4). The applicants considered two different methods. The first method is based on the Rabinowitz algorithm. Instead of minimizing the median residual-error, the alpha-trimmed mean residual-value is minimized. The search of minimum of the designed residual-function was based on a grid-search. Due to differentiability issues, the refinement of such a location could not be done with a gradient method. It was therefore decided to use a nonlinear simplex method. On the tests conducted, the run-time seemed to be longer and accuracy poorer than the second method implemented. The second and preferred method chosen comprises minimizing the least-square residual function (i.e. weighted sum of squared residuals as shown in Equation (4)) by a grid-search first. The refinement of the location obtained was then done with the gradient approach described by Lienert (i.e. "Marquard-Levenberg" algorithm combined with a centering-and-scaling procedure). The flow charts and processing flow of the algorithm are discussed herein and also detailed in FIGS. 4-6.

$$\forall (x, y, z, t) \in SolutionDomain, \tag{4}$$

$$R(x, y, z, t) \sum_{rec} \big[ \text{weight}_{T_P}(rec) \cdot R_{T_P}(rec, x, y, z) + \text{weight}_{T_S}(rec) \cdot R_{T_S}(rec, x, y, z) +$$

$$\text{weight}_{AzimP}(rec) \cdot R_{AzimP}(rec, x, y, z) + \text{weight}_{DipP}(rec) \cdot R_{DipP}(rec, x, y, z) + \text{weight}_{AzimS}(rec) \cdot$$

$$R_{AzimS}(rec, x, y, z) + \text{weight}_{DipS}(rec) \cdot R_{DipS}(rec, x, y, z) + \text{weight}_{Prior}(rec) \cdot \text{Prior}(rec, x, y, z, t) \big]$$

where:

$$R_{T_P}(rec, x, y, z, t) = [ArrivalTime_P^{measured}(rec) - t - TransitTime_P^{model}(rec, x, y, z)]^2 R_{T_S}(rec, x, y, z, t) =$$

$$[ArrivalTime_S^{measured}(rec) - t - TransitTime_S^{model}(rec, x, y, z)]^2 R_{AzimP}(rec, x, y, z) =$$

$$[Azimuth_P^{measured}(rec, ArrivalTime_P^{measured}(rec)) - Azimuth_P^{model}(rec, x, y)]^2 R_{AzimS}(rec, x, y, z) =$$

$$[Azimuth_S^{measured}(rec, ArrivalTime_S^{measured}(rec)) - Azimuth_S^{model}(rec, x, y)]^2 R_{DipP}(rec, x, y, z) =$$

$$[Dip_P^{measured}(rec, ArrivalTime_P^{measured}(rec)) - Dip_P^{model}(rec, x, y)]^2 R_{DipS}(rec, x, y, z)^2 =$$

$$[Dip_S^{measured}(rec, ArrivalTime_S^{measured}(rec)) - Dip_S^{model}(rec, x, y)]^2$$

Prior (rec, x, y, z, t) represents a penalizing function based on prior knowledge, rec=receiver index, 0<rec<(N+1), and N=number of receivers.

Although based on the minimization of the $L_2$ norm, Equation (4) can be written in a manner to minimize a different norm. Despite the refinement stage described in the present disclosure, the output of the CMM3D stage can be used as a final output yielding an estimate of the hypocenter location and origin-time. When required, the refinement of such a location can be done directly by any optimization technique for the search of the minimum of the residual-function. The combination grid-search followed by a gradient search can for instance be replaced by the following:
- simplex-based search
- grid-search
- gradient search
- beta-section search
- probabilistic search
- any combination of the different search of function-extremum techniques.

The refinement process described herein refers to any direct or indirect use of the CMM3D stage output. A reminder of such output is as following:

Hypocenter location.
Hypocenter origin-time.
Hypocenter modeled or approximated travel-times.
Hypocenter modeled or approximated arrival-times.

Although not mandatory, such output may be used to measure the values used in the residual-function or in the search of extremum of a residual-function (e.g. one of the starting points for a search of extremum of the residual function). The refinement stage can be used independently of the CMM3D output. A starting point for the grid search can be defined by a pre-defined location (e.g. "check-shot" location) or randomly selected in a predefined-region. Before running the refinement stage, measuring values can be done regardless of the output of CMM3D.

The following additional disclosure relates to the waveform processing techniques discussed above:

Polarization Computation:

Given 3C waveforms (Sx(t), Sy(t), Sz(t)) and a parameter time-window T, the covariance matrix is given by:

$$\forall t \in TimeDomain, C_T(t) = \begin{bmatrix} C_{xx}(t) & C_{yx}(t) & C_{zx}(t) \\ C_{xy}(t) & C_{yy}(t) & C_{zy}(t) \\ C_{xz}(t) & C_{yz}(t) & C_{zz}(t) \end{bmatrix}$$

$\forall t \in TimeDomain,$ $$C_{km}(t) = \frac{1}{T}\int_{t-\frac{T}{2}}^{t+\frac{T}{2}} (S_k(u) - E[S_k(t)]) \cdot \overline{(S_m(u) - E[S_m(t)])} du$$

where: $k, m \in \{x, y, z\}$ $$\forall t \in TimeDomain, E[S_k(t)] = \frac{1}{T}\int_{t-\frac{T}{2}}^{t+\frac{T}{2}} S_k(u) du$$

$$\forall u \in TimeDomain, S_k(u) \cdot \overline{S_k(u)} = |S_k(u)|^2$$

In the general case the covariance matrix is hermitian and therefore has real positive eigenvalues but complex eigenvectors. However when the signals Sx, Sy, Sz are real, the eigenvectors become real too. For real unit-eigenvectors, the incidence-angles can be provided by the following equation:

$$\vec{P} = \begin{bmatrix} Px \\ Py \\ Pz \end{bmatrix} = \begin{bmatrix} \cos(Azim) \cdot \sin(Dip) \\ \sin(Azim) \cdot \sin(Dip) \\ \cos(Dip) \end{bmatrix}$$

General Form of the Residual-Function:

$\forall (x, y, z, t) \in SolutionDomain,$ $$R(x, y, z, t) = \sum_{rec} \left( \sum_{i=1}^{NumverModelParameters} w_i \cdot \right.$$

$$ResidModelParam_i((rec, x, y, z, y)^{p_i} + Prior(rec, x, y, z))$$

where: $\forall_i$, $pi$ and $w_i$ are real numbers, $$ResidmodelParam_i(rec, x, y, z, t)^{p_i} =$$

$$P\left[\left|\frac{Measure_i(rec, t) - Model_i(rec, x, y, z, t)}{\sigma_{measure}}\right|^{n_i}\right],$$

$n_i$ and $\sigma_{measure}$ are real numbers

Prior (rec, x, y, z, t) represents a penalizing function based on prior knowledge, rec=receiver index, 0<rec<(N+1), N=number of receivers, "NumberModelParameters" is the number of parameters used to match the measure with the model values. For example, if only arrival-times of P and S-waves are used, then this number is equal to 2. However, if the incidence azimuth of both the P-waves is added, then this number becomes equal to 3.

General Form of the STA/LTA Operator:

$\forall t \in DomainDefinition (env), \forall gap \geq 0,$ $$StaLta(env, t) = \frac{\int_{t+gap}^{t+sw+gap} (env^{p1}(u) - w_1 \cdot env^{p2}(u)) \cdot du}{\int_{t-lw}^{t} (env^{p3}(u) - w_2 \cdot env^{p4}(u)) \cdot du}$$

where: "p1", "p2", "p3", "p4", "w1", "w2", "gap", "sw" and "lw" are real numbers.

In a related exemplary embodiment, the following methodology and sample operation is provided.

Event Detection and Location for a 3D Receiver Distribution

The input data are the 3C traces recorded at each receiver, r, at time samples, t, rotated to the geographic coordinate system: $E_r(t), N_r(t), U_r(t)$. The 3C energy envelope of the traces is defined as follows:

$$En_r(t) = H[E_r(t)]^2 + H[N_r(t)]^2 + H[U_r(t)]^2 \quad (5)$$

where $H[f(t)]$ signifies the envelope computation using the Hilbert transform of the function $f(t)$.

From the 3C energy, the signal to noise ratios for P- and S-waves, $SNRP_r(t)$ and $SNRS_r(t)$, are computed taking time window lengths for signal and noise time windows, stwp and ltwp, respectively:

$$SNRP_r(t) = \frac{ltwp}{stwp} \frac{\sum_{j=t}^{stwp+t-1} En_r(j)}{\sum_{j=t-ltwp-1}^{t} En_r(j)}. \quad (6)$$

As S-waves have different frequency content than P-waves, the signal to noise for S-waves, $SNRS_r(t)$, is computed taking different short and long time window lengths, stws and, ltws, respectively.

The real-time location algorithm proceeds in two steps: a detection step, where an estimate of $t_0$ and location is made, and a location step, where the estimated $t_0$ and polarizations are used. In both cases a map based on Equation (6) is used.

From the signal to noise ratios for P- and S-waves, the detection map, Det(t,x,y,z), is computed for each time sample, t, and grid node, (x,y,z). The value of the detection map is the product of $SNRP_r(t)$ and $SNRS_r(t)$ at the modeled P- and S-wave arrival times, $tp_r(x,y,z)$ and $ts_r(x,y,z)$ over all receivers, r:

$$Det(t, x, y, z) = \prod_{r=1}^{nr} SNRP_r(t + tp_r(x, y, z)) * SNRS_r(t + ts_r(x, y, z)) \quad (7)$$

It is noted that Equation (7) is equivalent to Part 1 in Equation (3a) above.

When the maximum value of the detection map exceeds a given threshold, then the event is considered detected. Its origin time, $t_0$, is the time of the maximum of the detection map and the origin time uncertainty, $\sigma t_0$, is the time range where the maxima of the detection map around the time, $t_o$, exceed 50% of the maximum at the estimated origin time.

Over the time window, $\sigma t_o$, at the origin time, $t_o$, the location step is then performed. The location requires information about the direction of the incoming energy at each receiver. One solution is to compute a probability function based on the continuously estimated P-wave polarization vector, $\vec{vm}_r(t)$ and its uncertainty, $\vec{\sigma}_r(t)$. For each grid position (x,y,z) a probability function is computed taking into account the P-wave modelled polarization vector, $\vec{vp}_r(x,y,z)$ as follows:

$$PDF_{pol}(x, y, z) = \prod_{r=1}^{nr}\prod_{i=1}^{3} \frac{1}{\sqrt{2\pi}\,\sigma_{ri}(t)} e^{-\left[\frac{vm_{ri}(t)-vp_{ri}(x,y,z)}{2\sigma_{ri}(t)}\right]^2}. \quad (8)$$

In Equation (8), the measured and modelled polarization vectors are normalized, and point both towards the same half-space. It is noted that Equation (8) may be viewed as an alternative to Equation (3b) above, which is a variant of Part 2 of Equation (3a). Here the index i is one of the three components of the polarization vector. While Equation (3a) forms the CMM objective function from a sum of terms corresponding to each of the receivers, Equation (8) uses a product of receiver terms.

The location map is then computed from the detection map values and the polarization probability function as follows:

$$Loc(x, y, z) = \frac{1}{\sigma t_o} \sum_{t=t_o-\sigma t_o/2}^{t_o+\sigma t_o/2+1} Det(t, x, y, z) PDF_{pol}(x, y, z) \quad (9)$$

The hypocenter and origin time values determined from Loc(x,y,z) and Det(t,x,y,z) can be used as initial values for time picking and hypocenter estimate initialization in a subsequent location refinement stage which uses the Geiger method. It is noted that the notation only presents the case where the velocity model is isotropic. In the case of TI velocity model, the times and polarization angles for P and Sh waves are computed and used.

Example

Synthetic Dataset

Figure 9:
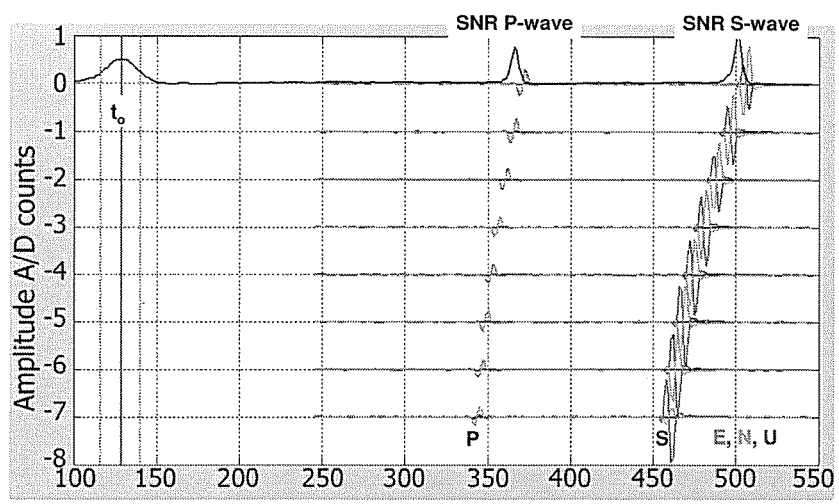
FIG. 9 is an example of a 3C synthetic event (East, North, Elevation components) for 8 of the 16 receivers used in this example. The SNR for P- and Sh-waves is plotted with the estimation of the origin time shown between 100 ms and 150 ms.

Synthetic data are created for events recorded by an array of 16 3C receivers distributed along a horizontal well path at a depth of 10204 ft with an orientation along the East-West direction. The radiation pattern for P and S is isotropic for all sources with a constant amplitude ratio. Minimal noise has been added for this dataset and only Sh shear arrivals are included (no Sv). An example of the 3C traces with the SNR functions (Equation 6 above) for the first receiver is shown in FIG. 9. The origin time, $t_o$, estimated at the detection step is also shown, with its uncertainty.

The velocity model used for data modeling and processing is homogeneous anisotropic with the parameters described in Table 2:

TABLE 2

Velocity Model Properties.

| Vp (ft/s) | Vs (ft/s) | Thomsen Epsilon | Thomsen Gamma | Thomsen Delta |
|---|---|---|---|---|
| 15500 | 9100 | 0.2 | 0.2 | 0.1 |

Figure 10:
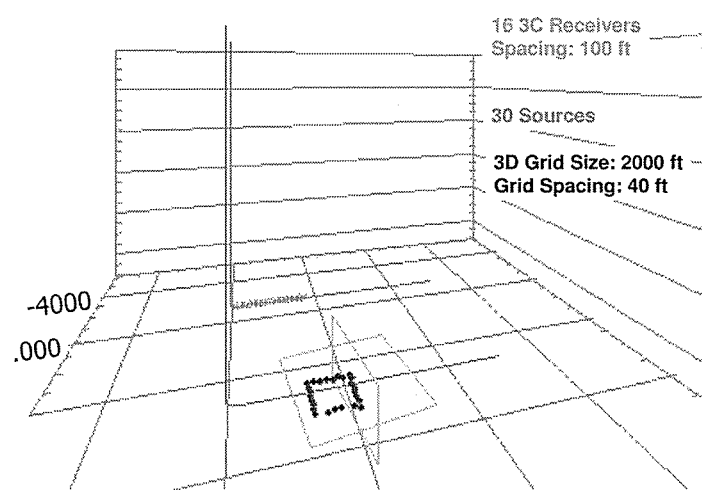
FIG. 10 is a 3D view of the 16 3C receiver positions and 30 source positions with the 3D grid size of 2000 ft on each side and grid spacing of 40 ft.

From the velocity model and receiver positions, the travel times and modelled polarization angles at the receivers are computed for a 3D grid. The grid size in the radial, transverse and vertical directions is 2000 ft with a spacing of 40 ft. In the displays that follow the 3D grid position is centered on the first event, located at the same depth as the receivers and oriented toward the middle of the receiver array at a distance of about 3580 ft (FIG. 10).

Figure 11:
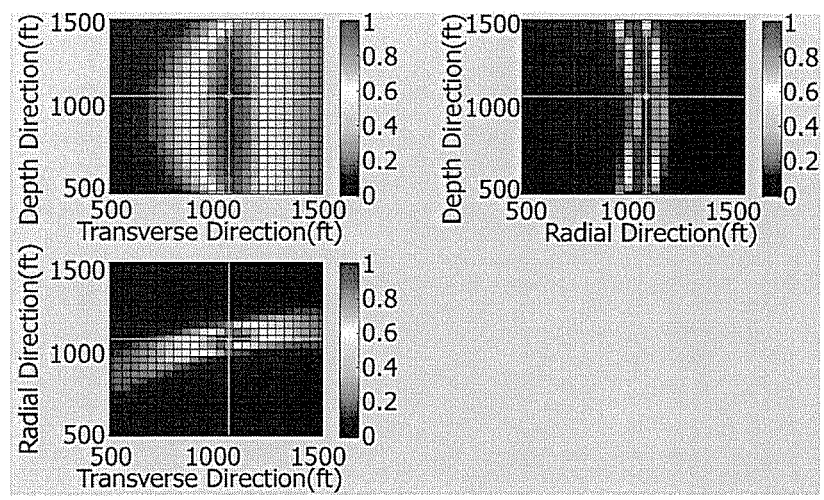
FIG. 11 are Transverse-Depth [top left], Radial-Depth [top right] and Transverse-Radial [bottom left] sections of the 3D detection map computed using Equation (7) below.

The detection map in FIG. 11 shows good resolution in plan view. However, no resolution is achieved in the depth section; taking into account only the SNR along the time moveout of the incoming energy is not enough to resolve the location in depth for a horizontally distributed receiver array.

Figure 12:
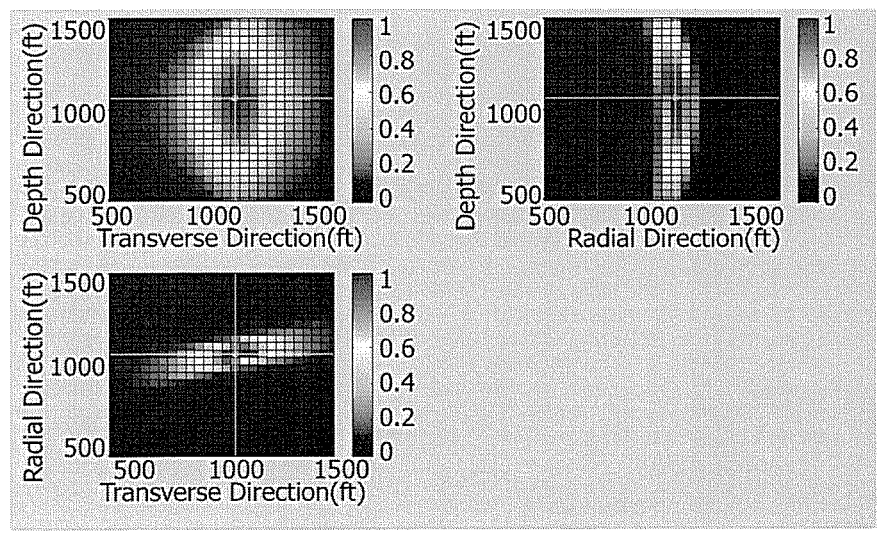
FIG. 12 are Transverse-Depth [top left], Radial-Depth [top right] and Transverse-Radial [bottom left] sections of the 3D location map computed from Equation (9) below.

Taking into account the polarization angle using the probability function described in Equation (8), resolution in depth is now achieved (as shown in FIG. 12), owing to the inclusion of information from the inclination part of the polarization vector. The plan view is very similar to that of the detection map because, due to the horizontal receiver distribution, adding information from the azimuth part of the polarization vector does not improve the horizontal component of location.

Example

Real Dataset

A hydraulic fracturing monitoring took place in Far East Asia from a deviated well. Due to constraints associated to high temperature, only three 3C receivers were deployed between 3800 m and 3925 m where the well deviation was around 30°. During the first stage of heavy brine injection, about 300 events were detected; while during the second injection stage of light brine, about 400 events were detected.

Figure 13:
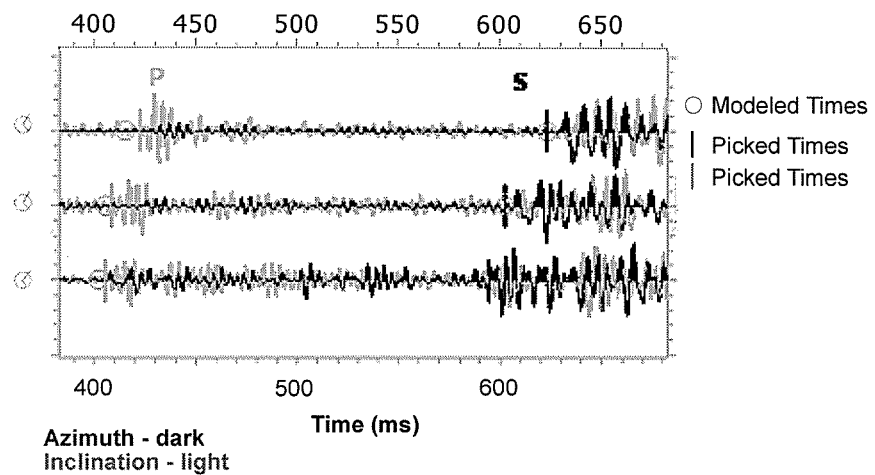
FIG. 13 is an example of one event recorded with three 3C accelerometers. The dark ticks are the user picked times for P-waves (in the time interval 400-430 ms), the lighter ticks are the times for Sh-waves (in the time interval 590-630 ms). The circles are the arrival times from estimated $t_0$ and location.
Figure 14:
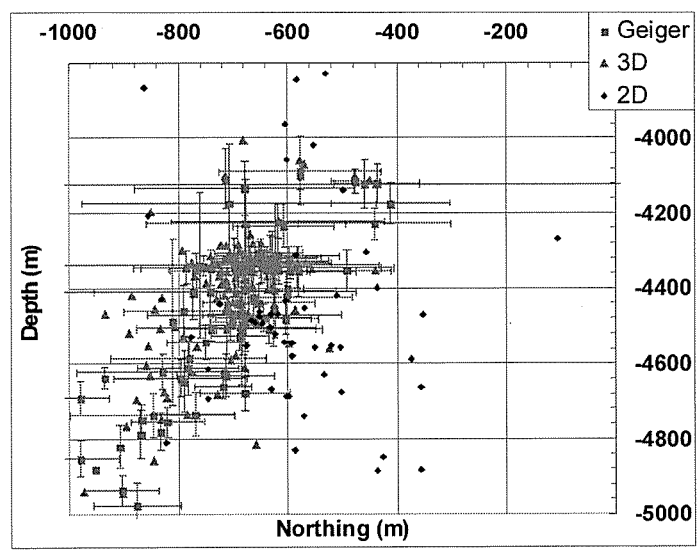
FIG. 14 is a comparison of location results from three methods. The classical Geiger results are shown with error bars; results obtained by aspects of the techniques disclosed herein are labeled "3D" with locations shown as triangles; and results obtained by CMM2D techniques are labeled "2D" with locations shown as squares.

Using the 2D approach, the times were not well estimated and the events were on average located 250 m shallower than the locations found using time picks and the Geiger method (Table 3 below). The 2D origin time and spatial coordinates were significantly different from those of the Geiger approach. For instance, for the event presented in FIG. 13, the origin time was estimated at 146 ms and the coordinates were: North: −899 m; Easting: 1175 m; Elevation: −4066 m whereas using the Geiger method the estimates were: 131 ms; −917 m+/−34; 983 m+/−25 m; −4902 m+/−87 m. The two locations were separated in depth by 837 m. Using the proposed method estimates are: 127 ms; −1000 m; 979 m; −5003 m. On average, the locations estimated using the proposed method are closer to the locations found with the Geiger method. In addition, the locations are far less scattered than the initial 2D location estimates (FIG. 14). Given the short array, the amount of noise in this data set and the large difference in the methods, this is judged to be a favorable comparison.

TABLE 3

Average coordinates in locations between the 2 methods and Geiger method over 110 events.

|  | East (m) | North (m) | Elevation(m) |
|---|---|---|---|
| Method 2D | 914 +/− 405 | −732 +/− 381 | −4202 +/− 618 |
| Method 3D | 1100 +/− 130 | −765 +/− 202 | −4486 +/− 299 |
| Geiger | 1056 +/− 95 | −716 +/− 168 | −4477 +/− 274 |

Thus, an algorithm has been described that provides an automatic solution for event detection and location in real-time when the receiver array is distributed in a deviated or horizontal well. In an exemplary embodiment of the general algorithm, the present method is based on the estimation of signal to noise ratios at modeled direct arrival times for P- and S-waves. The method of the present embodiment introduces the required polarization angle information within a probability function measuring the co-linearity of modeled and local estimates of P-wave polarization vectors. Results from a synthetic dataset show good resolution in depth for the extreme case of data acquisition from a receiver array deployed within a horizontal monitor well.

The method is applied to a real data set recorded by an array of three 3C receivers deployed within a well deviated at about 30°. The automatic location estimates are improved; the differences with estimates obtained after re-picking and using a gradient-based location inversion are in agreement.

This method is a grid search-based approach. Thus, it depends on the grid location and dimensions.

The resolution of the location depends on the recorded signal, in particular the signal to noise ratios and the radiation pattern covered by the receiver distribution. The accuracy of the proposed solution is based on these two elements, as well as the accuracy of the assumed velocity model.

It will be understood from the foregoing description that various modifications and changes may be made in the preferred and alternative embodiments of the present invention without departing from its true spirit. In addition, this description is intended for purposes of illustration only and should not be construed in a limiting sense.

What is claimed is:

1. A method of detecting and locating a microseismic event, comprising:
   providing an estimate of a velocity model for a formation;
   estimating a volume of space in which the microseismic event will most likely occur;
   dividing the volume into a plurality of sub-volumes;
   receiving data of the microseismic event with at least a first and a second seismic sensor located on a tool in a wellbore;
   approximating a location of the microseismic event in the volume to determine in which sub-volume the microseismic event occurred, based on the received data;
   applying a first grid search, based on the approximated location of the microseismic event, to derive a residual function over a finer sampling in the volume, the residual function being indicative of difference between received and modeled data and having a term for penalizing consideration of candidate locations with undesired spatial positions and/or waveform contents;
   applying a gradient search of the residual function to optimize the location of the microseismic event; and
   determining a more precise location of the microseismic event based on the gradient search;
   wherein the act of approximating comprises maximizing a CMM (coalescence microseismic mapping) objective function suitable for non-vertical sensor array over a time interval and a spatial volume;
   wherein the CMM objective function includes azimuth and dip of incident wave, said azimuth and dip having different factors for controlling discrimination sharpness.

2. A method according to claim 1, further comprising:
   applying a second grid search, based on the approximated location of the microseismic event, to refine spatial coordinates and origin time of the microseismic event.

3. A method according to claim 1, further comprising:
   generating a 3D spatial sampled volume of potential hypocenter locations; and
   generating a look-up table for P and S transit-times as well as P and S-waves azimuth and dip angles at each grid node in the volume.

4. A method according to claim 1, further comprising:
   determining multicomponent covariance matrix while receiving the data of the microseismic event;
   storing a largest eigenvalue of the covariance matrix and its associated eigenvector as a function of time;
   applying short-term average/long-term average (STA/LTA) time-picker to the largest eigenvalue of the covariance matrix; and
   determining and storing an azimuth and dip for the eigenvector.

5. A method according to claim 1, further comprising:
   acquiring time-delayed microseismic measurements; and
   cross-correlating output of an STA/LTA operator based on the time-delayed measurements.

6. A method according to claim 1, further comprising:
   estimating polarization based on the received microseismic data; and
   minimizing uncertainty associated with polarization estimates.

7. A method according to claim 1, wherein the approximating comprises:
   applying coalescence microseismic mapping (CMM) to a decimated grid;
   storing for every time sample a largest value of the CMM when applied to the decimated grid;
   obtaining a rough estimate of the microseismic event with an estimated origin time;
   refining event origin time and spatial coordinates by applying a second grid search to a CMM objective function over a finer grid.

8. A method according to claim 1, wherein:
   the first grid search comprises a grid search of a Geiger residual function; and
   the gradient search comprises utilizing a result of the first grid search as an initial guess for a minimum of the Geiger residual function.

9. A method according to claim 1, wherein:
   the wellbore is a deviated well.

10. A method according to claim 1, wherein:
    the wellbore is a horizontal well.

11. A method according to claim 1, wherein:
    the wellbore comprises a plurality of wells.

12. A method according to claim 1, wherein:
    the tool comprises a distributed array of seismic sensors having a non-vertical configuration and deployed in one or more wellbores traversing subterranean formations, the seismic sensors being configured for acquiring waveform data from microseismic events at locations away from the tool.

13. The method of claim 1, wherein the act of determining includes computing a location map from a detection map and a probability function for P-wave polarization.

14. A method of detecting and locating a microseismic event, comprising:
providing an estimate of a velocity model for a formation;
estimating a volume of space in which the microseismic event will most likely occur;
dividing the volume into a plurality of sub-volumes;
receiving data of the microseismic event with at least a first and a second seismic sensor located on a tool in a wellbore;
approximating a location of the microseismic event by coalescing a plurality of seismic signals received with the seismic sensors at selected locations and time in the volume to determine in which sub-volume the microseismic event occurred; and
determining a more precise location of the microseismic event by a grid search of a residual function, over a finer sampling in the volume, followed by a gradient search of the residual function to locate one or more events utilizing the signals, the residual function being indicative of difference between received and modeled data and having a term for penalizing consideration of candidate locations with undesired spatial positions and/or waveform contents;
wherein the act of approximating comprises maximizing a CMM (coalescence microseismic mapping) objective function suitable for non-vertical sensor array over a time interval and a spatial volume;
wherein the CMM objective function includes azimuth and dip of incident wave, said azimuth and dip having different factors for controlling discrimination sharpness.

15. A method according to claim 14, wherein:
the grid search comprises a first grid search of a Geiger residual function; and
the gradient search comprises utilizing a result of the first grid search as an initial guess for a minimum of the Geiger residual function; and
the method further comprising:
applying a second grid search, based on the approximated location of the microseismic event, to refine spatial coordinates and origin time of the microseismic event.

16. A method according to claim 15, wherein:
the second grid search comprises 3D coalescence microseismic mapping (CMM).

17. The method of claim 14, wherein the act of determining includes computing a location map from a detection map and a probability function for P-wave polarization.

18. A system of processing waveform data, comprising:
an acoustic tool comprising at least a first and a second seismic sensor;
a computer in communication with the acoustic tool; and
a set of instructions executable by the computer that, when executed:
receive data of an event with at least the first and the second seismic sensor located on the tool in a wellbore;
approximate a location of the event in a volume of space comprising a plurality of sub-volumes to determine in which sub-volume the event occurred, based on the received data;
apply a first grid search to obtain spatial coordinates and origin time of the event based on the approximate location of the event;
apply a second grid search to derive a residual function at nodes of a finer grid, the residual function being indicative of difference between received and modeled data and having a term for penalizing consideration of candidate locations with undesired spatial positions and/or waveform contents;
apply a gradient search of the residual function to optimize the location of the event; and
determine a more precise location of the event based on the gradient search;
wherein the act of approximating comprises maximizing a CMM (coalescence microseismic mapping) objective function suitable for non-vertical sensor array over a time interval and a spatial volume;
wherein the CMM objective function includes azimuth and dip of incident wave, said azimuth and dip having different factors for controlling discrimination sharpness.

19. A system according to claim 18, wherein:
the tool comprises a distributed array of seismic sensors having a non-vertical configuration and deployed in one or more wellbores traversing subterranean formations, the seismic sensors being configured for acquiring waveform data from microseismic events at locations away from the tool.

20. The system of claim 18, wherein the act of determining includes computing a location map from a detection map and a probability function for P-wave polarization.

* * * * *